United States Patent [19]
Sawada et al.

[11] Patent Number: 5,788,758
[45] Date of Patent: Aug. 4, 1998

[54] METHOD FOR MANUFACTURING BLUE PIGMENT

[75] Inventors: Hiroshi Sawada; Shinsuke Imai; Muneaki Tomotake; Kaori Akita, all of Osaka, Japan

[73] Assignee: House Foods Corporation, Higashiosaka, Japan

[21] Appl. No.: 874,409

[22] Filed: Jun. 13, 1997

[30] Foreign Application Priority Data

Jun. 17, 1996 [JP] Japan ................ 8-177101

[51] Int. Cl.$^6$ ........................... C08K 5/00
[52] U.S. Cl. ............... 106/493; 106/406; 106/407; 106/499
[58] Field of Search ................ 106/406, 407, 106/493, 499

[56] References Cited

FOREIGN PATENT DOCUMENTS 53-113051  10/1978  Japan .

OTHER PUBLICATIONS

Linda P. Nock, et al., Plant Physiol., vol. 85, pp. 1079–1083, 1987, "The C–S Lyases of Higher Plants". No Month.
M.A. Joslyn, et al., Food Res., vol. 21, pp. 170–183, 1956, "The Formation and Decomposition of Green Pigment in Crushed Garlic Tissue". No Month.
M. Yamaguchi, et al., Proc. Am. Soc. Hort. Sci., vol. 86, pp. 475–483,1965, "Factors Affecting the Formation of a Pink Pigment in Purees of Onion". No Month.
S. Shannon, et al., J. Agric Food Chem., vol. 15, No. 3, pp. 423–426, May–Jun. 1967, "Precursors Involved in the Formation of Pink Pigments in Onion Purees".
S. Shannon, et al., J. Agric Food Chem., vol. 15, No. 3, pp. 423–426, May–Jun. 1967, "Reactions Involved in the Formation of a Pink Pigment in Onion Purees".
T.M. Lukes, Journal of Food Science, vol. 51, No. 6, pp. 1577 and 1582, 1986, "Factors Governing the Greening of Garlic Puree". No Month.

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

The present invention is intended to provide a method for manufacturing a natural blue pigment that can be used in food products and the like, and the present invention relates to a method for manufacturing a blue pigment, comprising the steps of combining and warming the reaction product of PeCSO and alliinase, an amino acid, and allicin in an aqueous solution. Other embodiments of the present invention include the aforementioned method for manufacturing a blue pigment, further comprising the steps of extracting the reaction product of PeCSO and alliinase with a water-insoluble organic solvent, and allowing the reaction product to further react with an amino acid in an aqueous solution with the resulting component, and subsequently adding allicin to the reaction mixture to develop blue color, as well as the aforementioned method for manufacturing a blue pigment, further comprising the steps of combining the reaction product of PeCSO and alliinase, an amino acid, and allicin in an aqueous solution, and subsequently heat treating these materials before they are warmed.

4 Claims, 2 Drawing Sheets

METHOD FOR MANUFACTURING BLUE PIGMENT

BACKGROUND OF THE INVENTION

1. Field of the Invention

The present invention relates to a method for efficient production of natural blue pigments that can be used in food products and the like, the development of which has been strongly desired, as well as to a method for manufacturing blue pigments using only edible materials derived from food crop that are safe for human consumption. And this invention in particular relates to a method for efficiently producing a blue pigment by combining the reaction product of alliinase and PeCSO (trans-(+)-S-(1-propenyl)-L-cysteine sulfoxide, CAS: 3836-24-6) such as that contained in plants and the like selected from genus Allium such as leek and onions and crossbreeds thereof, allicin, which is a reaction product of alliinase and alliin found in plants and the like selected from plants such as garlic and onions of the genus Allium and crossbreeds thereof, and an amino acid. The present invention also relates to a method for making the blue pigment thus obtained into powder.

2. Description of Related Art

Most naturally occurring blue pigments are anthocyans type, such as those responsible for the color of the flowers of hydrangea or spiderwort, but since they turn red under acidic conditions and have extremely poor stability, they are difficult to use in food products and the like, and are not used widely as food colorants. Although research has therefore been conducted on many natural blue pigments, only pigments derived from Gardenia or spirulina are commercially available for use as natural blue pigments. These natural blue pigments are expensive and sometimes precipite under acidic conditions with a pH of 4 or less, so their use in food products in particular is limited, and the range of food products with which such blue pigments can be used is by no means a broad one.

Plants such as garlic have been known for years to change color when processed, and it is also known, for example, that when garlic cloves are pureed into paste and stored, the garlic puree sometimes turns green.

However, these changes in color are regarded as compromising the commercial value of food products. There have been no attempts to make use of the pigments despite research on discoloration of garlic puree have been directed towards prevention of pigment formation.

An example of a method which has been proposed in the past to prevent garlic from turning green is the method for preventing garlic from turning green in Japanese Laid-Open Patent Publication No. 53-113051 (1978), characterized in that dormant garlic cloves are peeled and heat treated, then ground into a paste, frozen as needed and stored, and then thawed, and a material containing alliinase is then added to and mixed with the garlic paste to obtain a paste with a pH of no more than 5.0.

Past experience has also shown that raw onion paste and raw garlic paste turn blue or green when they are mixed, this has been considered as an accident in a cooking or processing process, and discolored pastes has never been considered for use as a coloring agent, particularly food coloring. Moreover, the strong odor of garlic associated with the paste would have excluded the idea of such use.

Even if pigments obtained by mixing onion and garlic pastes were to be considered for use as a coloring agent, the pigments are strongly attached to components in the paste and are hard to be extracted. They are not extractable with water, and large quantity of solvent such as alcohol must be used, posing another obstacle to the use of such pastes as pigments.

As a result of long detailed study on a method for manufacturing a blue to green pigment by mixing onions and garlic, the inventors completed an invention relating to a method for producing a blue pigment and filed Japanese Patent Application No. 7-59975 (1995) upon discovering that blue-colored pigment, including blue, blue-purple, and blue-green, could be formed by mixing a prescribed proportion of aqueous extract of garlic bulbs with aqueous extract of the bulbs of plants other than garlic, such as onions selected from the genus Allium and crossbreeds thereof.

Upon continuing their research based on the aforementioned findings, the inventors extracted trans-(+)-S-(1-propenyl)-L-cysteine sulfoxide (PeCSO) from aqueous extracts of bulbs of plants other than garlic, such as onions selected from the genus Allium and crossbreeds thereof, and mixed and warmed the PeCSO with aqueous extract of garlic bulbs, confirming that the mixture turned blue. However, as a result of further research intended to remedy the low concentration of the resulting color and to shorten the time needed for the pigment to form pigment, the inventors completed the present invention upon discovering that the aforementioned drawbacks could be resolved by combining and warming the reaction product of PeCSO and alliinase, an amino acid, and allicin in an aqueous solution.

SUMMARY OF THE INVENTION

The present invention is intended to provide a method for manufacturing a natural blue pigment that can be used in food products and the like.

The present invention relates to a method for manufacturing a blue pigment, comprising the steps of combining and warming the reaction product of PeCSO and alliinase, an amino acid, and allicin in an aqueous solution. Other embodiments of the present invention include the aforementioned method for manufacturing a blue pigment, further comprising the steps of extracting the reaction product of PeCSO and alliinase with a water-insoluble organic solvent, redissolving the reaction product in water, then adding an amino acid to the resulting aqueous solution, and subsequently adding allicin to the reaction mixture, as well as the aforementioned method for manufacturing a blue pigment, further comprising the steps of combining the reaction product of PeCSO and alliinase, an amino acid, and allicin in an aqueous solution, and subsequently heat treating the reaction mixture for a short time before they are warmed.

The present invention allows efficient manufacture of a natural blue pigment that can be used in food products and the like, the development of which has been strongly desired to date. A clear-toned blue pigment can also be readily manufactured. The resulting blue pigment is suitable for use as a colorant, in food, bath agent, cosmetics, toy, clothing, and the like.

DETAILED DESCRIPTION OF THE INVENTION

An objective of the present invention is to provide a method for efficient production of a blue pigment, allowing a novel blue pigment that can be used in food products and the like to be manufactured in a relatively short period of time.

Another objective of the present invention is to provide a novel method for manufacturing a blue pigment with little impurities, allowing a clear blue pigment.

Yet another objective of the present invention is to provide a method for manufacturing a concentrated blue pigment of which the original blue color could be restored upon rehydration of the dried pigment.

Still another objective of the present invention is to provide a blue pigment based on all natural components and is useful as a coloring agent in food, bath agent, cosmetic, toy, clothing, and the like.

The first embodiment of the present invention for resolving the aforementioned drawbacks is a method for manufacturing a blue pigment, comprising the steps of combining and warming the reaction product of PeCSO and alliinase, an amino acid, and allicin in an aqueous solution.

The second embodiment of the present invention for resolving the aforementioned drawbacks is a method for manufacturing a blue pigment as defined in the first embodiment above, further comprising the steps of extracting the reaction product of PeCSO and alliinase with a water-insoluble organic solvent, adding an amino acid to react it with the resulting component, and subsequently adding allicin to the reaction mixture for further reaction.

The third embodiment of the present invention for resolving the aforementioned drawbacks is a method for manufacturing a blue pigment as defined in the first embodiment above, further comprising the steps of combining the reaction product of PeCSO and alliinase, an amino acid, and allicin in an aqueous solution, and subsequently heat treating the solution before warming.

A fourth embodiment of the present invention for resolving the aforementioned drawbacks is a method for manufacturing a blue pigment concentrate, comprising the steps of adding one or more of saccharides, sugar alcohols, or reducing agents to the blue pigment obtained by the method as defined in the first through third embodiments above, and subsequently drying the resulting mixture.

The present invention comprises combining and warming the reaction product of PeCSO and alliinase (hereinafter referred to as the reaction product), an amino acid, and allicin in an aqueous solution, and the following methods can be given as examples of methods for combining the reaction product of PeCSO and alliinase, an amino acid, and allicin in an aqueous solution.

The first example of the method is to combine the PeCSO, alliinase, amino acid, and alliin in an aqueous solution.

The second example of the method is to combine the PeCSO, alliinase, amino acid, and allicin in an aqueous solution.

The third example of the method is to combine the reaction product of PeCSO and alliinase, an amino acid, alliinase, and alliin in an aqueous solution.

The fourth example of the method is to combine the reaction product of PeCSO and alliinase, an amino acid, and allicin in an aqueous solution.

The fifth example of the method is to extract the reaction product of PeCSO and alliinase with a water-insoluble organic solvent, and to combine with the resulting component an amino acid, alliin, and alliinase in an aqueous solution.

An example of a sixth method is to extract the reaction product of PeCSO and alliinase with a water-insoluble organic solvent, and to combine with the resulting compound an amino acid and allicin in an aqueous solution.

The ratio of the PeCSO and alliin should be 1:2 or more by weight when PeCSO and alliin are combined in the aforementioned methods. The amino acid used in the aforementioned methods should be combined in an amount of 5.2 µmole or more per 1.0 mg of PeCSO 5.6 µmole.

PeCSO occurs in the bulbs of plants such as onions of the genus Allium and crossbreeds thereof (molecular formula: $C_6H_{11}NO_3S$. HRFAB-MS (m/z): found 178.052892 (M+H)$^+$, calcd. 178.053790). The aqueous extract of bulbs may therefore be used as such, or the PeCSO may be extracted from the aqueous extract and used, but since the bulbs contain enzymes such as alliinase, the enzymes must first be inactivated when the PeCSO is extracted and used, or enzymes such as alliinase must be otherwise treated so as to prevent it from showing activity. When the aforementioned enzymes are inactivated by heat treatment, the heating conditions are not particularly limited, provided that they allow the aforementioned enzymes to be inactivated. The heat treatment takes 5 to 10 minutes when a whole bulb of onion is heated in a 600 W microwave oven, but this range can be adjusted as needed. Heating methods other than a microwave oven, such as steaming or boiling, can also be employed. A soaking treatment in an alcohol is another example of a method that can be used to suppress enzyme activity.

Aqueous extracts containing PeCSO from the bulbs of genus Allium and crossbreeds thereof can be prepared by the following method. Typical examples of plants in the genus Allium in the present invention include Allium fistulosum, Allium fistulosum var. caespitosum, Banno onions, Allium cepa, Allium ascalonicum, and Allium sativum. For example, if onion (Allium Cepa) is to be used, an aqueous extract can be obtained by first removing the skin of fresh bulbs, then leaving the bulb as a whole or cutting them into a suitable size, wrapping them, and then heat treating them in a microwave. The onions which have thus been heat treated are then ground in a kitchen blender, an equivalent weight's worth of water is then added, the mixture is allowed to stand overnight, and the insolubles are removed by filtration or centrifugation or other suitable methods to obtain the aqueous extract.

As an example of a method for extracting PeCSO from the resulting aqueous extract, the aqueous extract is treated with a cation exchange resin and then eluted with ammonia, the pH of it is adjusted to about 3 with hydrochloric acid or the like, the eluate is then separated by medium pressure liquid chromatography using a reverse phase column, and the fraction containing PeCSO is dried into a powder in an evaporator.

Alliinase is found in the bulbs of plants belonging to the genus Allium, such as garlic. Accordingly it can be extracted in the form of a crude enzyme from such bulbs, or the crude enzyme preparation can be subjected to further purification procedure to obtain an isolated alliinase preparation.

As an example of a method for preparing a crude enzyme solution of alliinase is exemplified as follows.

Garlic cloves are ground with water and then centrifuged. The pH of the supernatant is adjusted to 4.0 and the enzyme is isoelectrically precipitated. The precipitate is collected by centrifugation, and redissolved in a buffer. Purified alliinase can be obtained by adding hydroxyapatite to the crude enzyme solution, then recovering the hydroxyapatite by centrifugation, and eluting the enzyme adsorbed to the hydroxyapatite with higher concentration buffer, removing the hydroxyapatite by centrifugation to obtain the purified enzyme solution. The enzyme can be buffer purified by subjecting the solution to a Con A-Sepharose 4B Column and eluting it with buffer containing α-D-mannopyranoside to recover the active fraction.

Reference: L. Nock and M. Mazelis, Plant Physiol., 85, 1079–1083 (1987)

Examples of suitable amino acids that can be used for pigment formation include glycine, glutamine, serine, threonine, asparagine, ethylcysteine, glutamic acid, arginine, valine, methionine, 2-aminobutyric acid, leucine, isoleucine, phenylalanine, lysine, and 3-aminobutyric acid. One or more of these amino acids can be used as desired.

Alliin occurs in garlic bulbs. Aqueous extracts of such bulbs may accordingly be used as such, or the alliin may be extracted from the aqueous extract and used. As the bulbs contain enzymes such as alliinase, the enzymes must first be inactivated, or must be otherwise treated so as to prevent the enzymes from showing activity. When the aforementioned enzymes are to be inactivated by heat treatment, the heating conditions are not particularly limited, provided that they allow the aforementioned enzymes to be inactivated. The heat treatment takes 5 to 10 minutes at 600 W when the enzymes are heated in a microwave, but this range can be adjusted as needed. Heating methods other than a microwave, such as steaming or boiling, can also be employed. A soaking treatment in an alcohol is another example of a method that can be used to suppress enzyme activity.

An aqueous extract containing alliin from garlic bulbs can be prepared by the following method, for example. An aqueous extract of garlic can be obtained by first removing the skin of fresh garlic cloves, then leaving the garlic as a whole or cutting it into a suitable size, wrapping it, for example, and then heat treating it in a microwave. The garlic which has thus been heat treated is then ground in a kitchen blender, an equivalent weight's worth of water is then added, the mixture is allowed to stand overnight, and the insolubles are removed by filtration or centrifugation or other suitable methods to obtain the aqueous extract.

An example of a method for furthermore purifying alliin from the aqueous extract of garlic is described below, the aqueous extract is treated with a cation exchange resin and then eluted with ammonia. The pH of the eluate is adjusted to about 3 with hydrochloric acid or the like, and the eluate is then subjected to medium pressure liquid chromatography using a reverse phase column, and the separated product is dried into a powder in an evaporator.

Allicin is produced by a reaction between alliin and alliinase. An example of a method for preparing allicin is a method in which alliin that has been extracted by the aforementioned method is treated with alliinase and then extracted with an organic solvent such as ether. The extract is dried in an evaporator, and the dried product is then redissolved in water.

The reaction product of PeCSO and alliinase can be obtained by treating PeCSO which has been extracted by the aforementioned method with alliinase preparation. Otherwise, since PeCSO and alliinase occur in the bulbs of onions and other plants selected form the genus Allium and crossbreeds thereof, the reaction product can be obtained directly from an aqueous extract of such bulbs.

In the present invention, the blue color formation can be accelerated a heat treatment for a specific period of time when the reaction product of the PeCSO and alliinase, an amino acid, and allicin are combined in an aqueous solution. That is, after the reaction product of the PeCSO and alliinase, the amino acid, and the allicin have been combined in an aqueous solution, the heat treatment can be performed before the reaction materials are warmed, so as to improve the blue coloring effects.

To further accelerate the blue color formation, first, an amino acid can be added to and combined with the reaction product of PeCSO and alliinase, with subsequent heat treatment and then after adding allicin to the reaction mixture, allicin can be combined, another heat treatment can be applied. The reaction mixture can then be warmed, so as to complete the blue color formation. A blue color can be induced within 10 minutes at an elevated temperature of about 100° C. under the heat treatment conditions, and a blue color can also be induced in a shorter period of time by setting the heating temperature even higher. A temperature of about 30° to 40° C. is suitable for the warming conditions, in which case, desired coloration can be achieved in 1 to 3 days.

Although a blue color can be produced by combining and warming the reaction product of PeCSO and alliinase, an amino acid, and allicin in an aqueous solution, the pH of the solution in this case should be 4.5 to 7 or more, preferably 5 to 6 or more. This allows the blue color is formed most efficiently.

The blue pigment solution obtained by the aforementioned method shows a vivid blue color, and can be used as such for food coloring, but the blue pigment solution can also be concentrated. An example of a specific method for this purpose disclosed hereunder one or more of saccharides, sugar alcohols, or reducing agents are added to the resulting blue pigment solution, before the solution is concentrated. Preferable examples of saccharides include glucose and sucrose. Desirable examples of sugar alcohols include sorbitol and mannitol. Preferable examples of reducing agents include sodium ascorbate.

An example of another method is one in which the blue pigment solution is applied to a porous resin such as DIAION HP-20, washed with water, and eluted with an aqueous alcohol solution such as methanol. This method allows impurities to be removed from the aforementioned blue pigment solution, yielding pigment solution with higher stability of color during concentration.

BRIEF DESCRIPTION OF THE DRAWINGS

FIG. 4 also shows the effect of heat treatments on the color formation of the reaction mixture.

DESCRIPTION OF THE PREFERRED EMBODIMENTS

The present invention is described in greater detail below with reference to examples, but the present invention is not limited to any of these examples.

EXAMPLE 1

2.5 mg of PeCSO powder was added to 5.5 mL of 0.1M sodium acetate buffer having a pH of 5.6, alliin powder was then added in varying weight ratios of 1:1, 1:2, 1:3, 1:4, and 1:5 with respect to the PeCSO powder, 0.5 mL of 2M glycine and 0.5 mL of alliinase were then added to the mixture, and the mixture was warmed for 2 days at 37° C. The blue color obtained as a result of the above were evaluated as an absorbance at 590 nm. The results are given in FIG. 1. PeCSO powder was obtained by extraction from onion bulbs followed by drying. Alliin powder was obtained by extraction from garlic by the aforementioned method and subsequent drying. Crude enzyme prepared from garlic by the aforementioned method was used for the alliinase.

Figure 1:
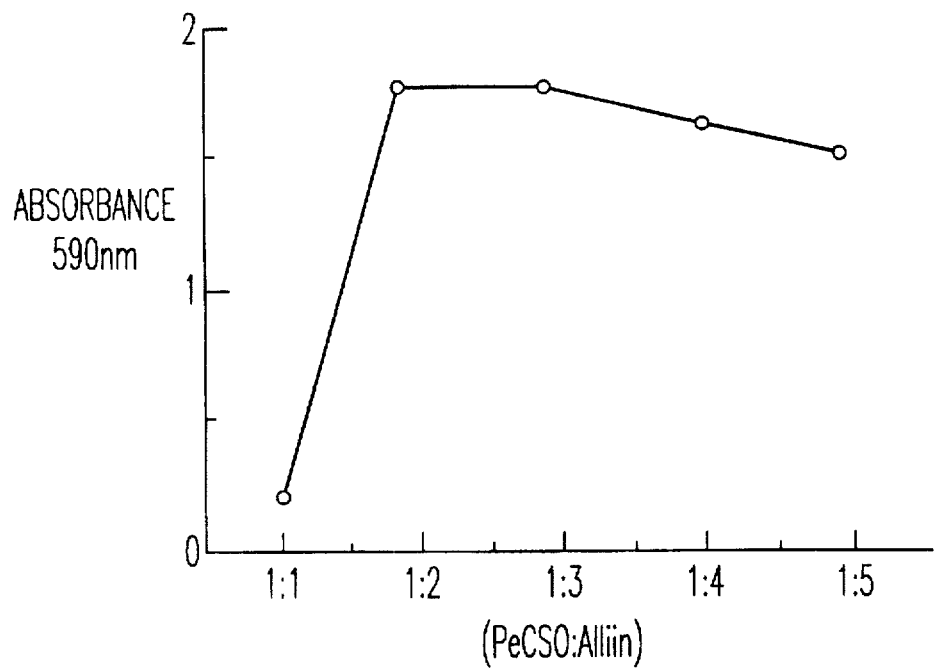
FIG. 1 depicts the relationship of color to weight ratio between PeCSO and alliin in the reaction mixture.

As shown in FIG. 1, the yield of blue pigment could be dramatically improved by adding alliin in an amount twice or more of the amount of PeCSO. Accordingly, when the reaction product of PeCSO and alliinase, an amino acid, and alliin are combined and warmed in an aqueous solution by the first method described above, it is found effective to use alliin in an amount two or more times the amount of PeCSO for the best coloration pigment formation.

EXAMPLE 2

1 mg of PeCSO and 2 mg of alliin were added to 2.2 mL of 0.1M sodium acetate buffer with a pH of 5.6, and 0.2 mL of alliinase in the form of a crude enzyme solution and the prescribed amounts of glycine were added to the mixture. The resulting mixture was warmed for 3 days at 37° C. The blue color thus obtained was evaluated by measuring absorbance at 590 nm. The results are given in FIG. 2.

Figure 2:
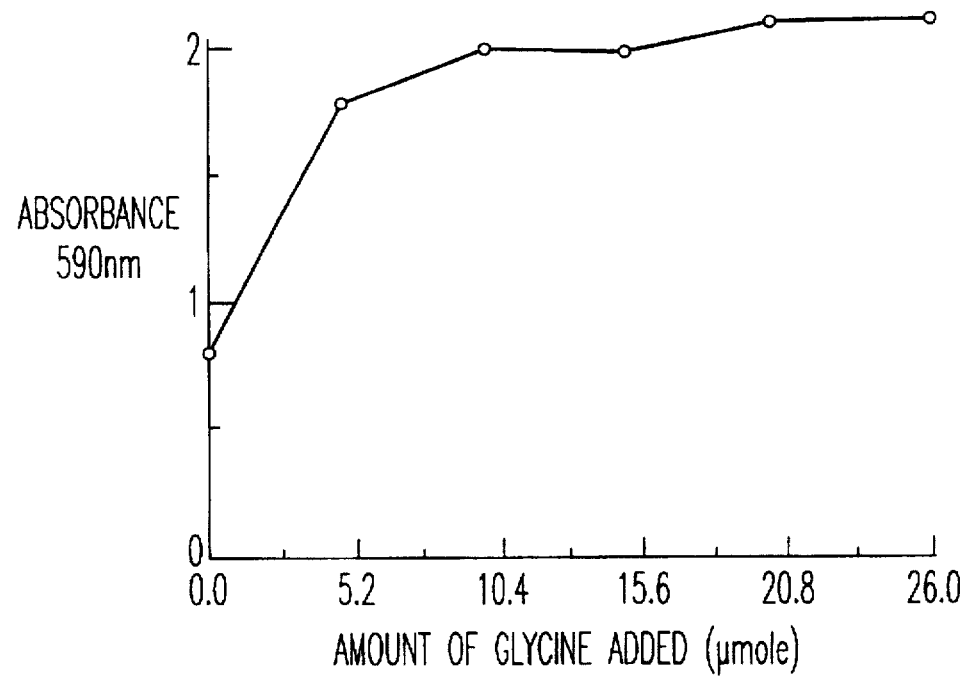
FIG. 2 depicts the relationship between the amount of glycine added and the blue color obtained.

It is apparent from FIG. 2 that when glycine was added in an amount of 5.2 μmole or more per 1 mg (5.6 μmol) of PeCSO the absorbance at 590 nm was far greater than when no material was added, indicating that addition of amino acid is essential for the effective increasing pigment formation.

PRACTICAL EXAMPLE 3

1.5 mL PeCSO solution (10 mg/mL) and 0.5 mL purified alliinase (400 u/mL) were mixed and allowed to react for 1 minute at 37° C., the reaction product was extracted three times with ether, and the extract was dried in an evaporator. The dried product was then redissolved in 30 mL of sodium acetate buffer with a pH of 5.6 to obtain an aqueous solution containing reaction product of PeCSO and alliinase (hereinafter referred to as reaction product solution). Next, 20 mL alliin solution (10 mg/mL) and 6.5 mL alliinase (400 u/mL) were mixed and allowed to react for 1 minute at 37° C. The reaction product was extracted with ether, and the extract was dried in an evaporator to obtain allicin. The dried product was subsequently redissolved in 20 mL of distilled water to obtain an allicin solution.

3 mL of the reaction product solution, 0.3 mL of 0.1M glycine, and 0.3 mL of allicin solution were then allowed to react as outlined in (1) through (4) below. The blue coloring effects obtained as a result of the above were evaluated using an absorbance at 590 nm. The results are given in FIG. 3. All heat treatments were carried out in boiling water for 10 minutes.

(1) The reaction mixture solution, glycine, and the allicin solution were mixed and then warmed at 37° C.

(2) The reaction mixture solution, glycine, and the allicin solution were mixed, then heat treated, and then warmed at 37° C.

(3) The reaction mixture solution and glycine were mixed and then heat treated as above, and the allicin solution was then mixed therein, and the mixture was then warmed at 37° C.

(4) The reaction mixture solution and glycine were mixed and then heat treated, the allicin solution was then mixed therein, and the mixture was then heat treated again and then warmed at 37° C.

Figure 3:
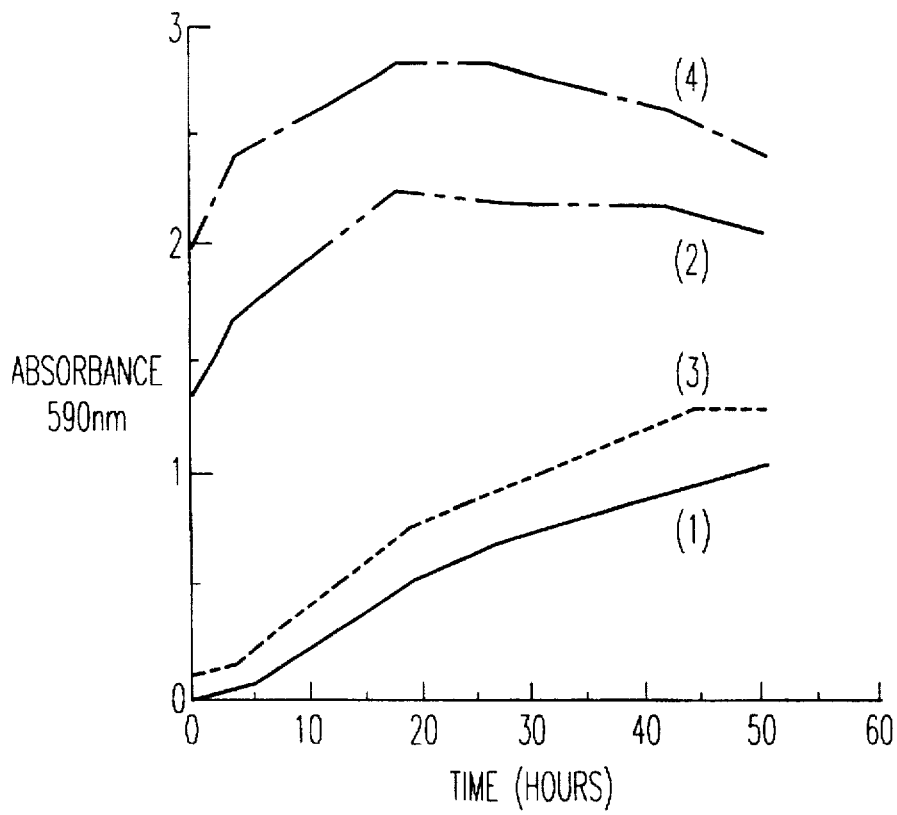
FIG. 3 depicts the relationship between heat treatment conditions and the effects in accelerating blue color formation.

It is apparent in FIG. 3 that a blue pigment was rapidly developed by combining the reaction mixture, glycine, and allicin solution, and then subjecting the mixture to a heat treatment. It may also be seen from FIG. 3 that the color yield is further improved by mixing the reaction mixture and glycine, and then subjecting the mixture to a heat treatment, and then after adding allicin to the mixture, subjecting the mixture to another heat treatment.

EXAMPLE 4

1 mL PeCSO (10 mg/mL) solution and 1 mL of 0.1M sodium acetate buffer with a pH of 5.6 were mixed, 0.33 mL alliinase solution (400 u/mL) was then added to the mixture, and the mixture was allowed to react 1 minute at 37° C., the reaction product was extracted three times with ether, and was dried in an evaporator to obtain a PeCSO and alliinase reaction product. The product was redissolved in 2 mL distilled water and divided into 1 mL portions, and 9 mL of 0.1M sodium acetate buffer with a pH of 5.6 was added to one 1 mL portion, while 9 mL distilled water was added to the other 1 mL portion, to make 10 mL reaction product solutions having two different pH values.

Each of these were then divided into 3 mL portions, to make a total of six reaction product solutions, and each reaction product solution was allowed to react as outlined in (1) through (3) and (A) through (C) below to develop blue color. The amount of blue color obtained as a result of the above were evaluated at an absorbance of 590 nm. The results are given in FIG. 4.

The reaction product solutions obtained using sodium acetate buffer had a pH of 5.6 and are designated as (1) through (3), while the reaction product solutions obtained using distilled water had a pH of 3.5 and are designated as (A) through (C). All heat treatments in (2), (3), (B), and (C) were performed in boiling water for 10 minutes.

(1) 0.3 mL of 0.1M glycine and 0.3 mL of allicin solution were mixed with the reaction mixture solution, and the mixture was then warmed at 37° C.

(2) 0.3 mL of 0.1M glycine and 0.3 mL of allicin solution were mixed with the reaction mixture solution, and the mixture was then heat treated and then warmed at 37° C.

(3) 0.3 mL of 0.1M glycine was mixed with the reaction mixture solution, the mixture was then heat treated, 0.3 mL of allicin solution was then mixed therein, the mixture was then heat treated again, and the mixture was then warmed at 37° C.

(A) Except for the use of distilled water instead of sodium acetate buffer, everything was done in the same manner as in (1) above, and the mixture was warmed at 37° C.

(B) Except for the use of distilled water instead of sodium acetate buffer, everything was done in the same manner as in (2) above, and the mixture was warmed at 37° C.

(C) Except for the use of distilled water instead of sodium acetate buffer, everything was done in the same manner as in (3) above, and the mixture was warmed at 37° C.

Figure 4:
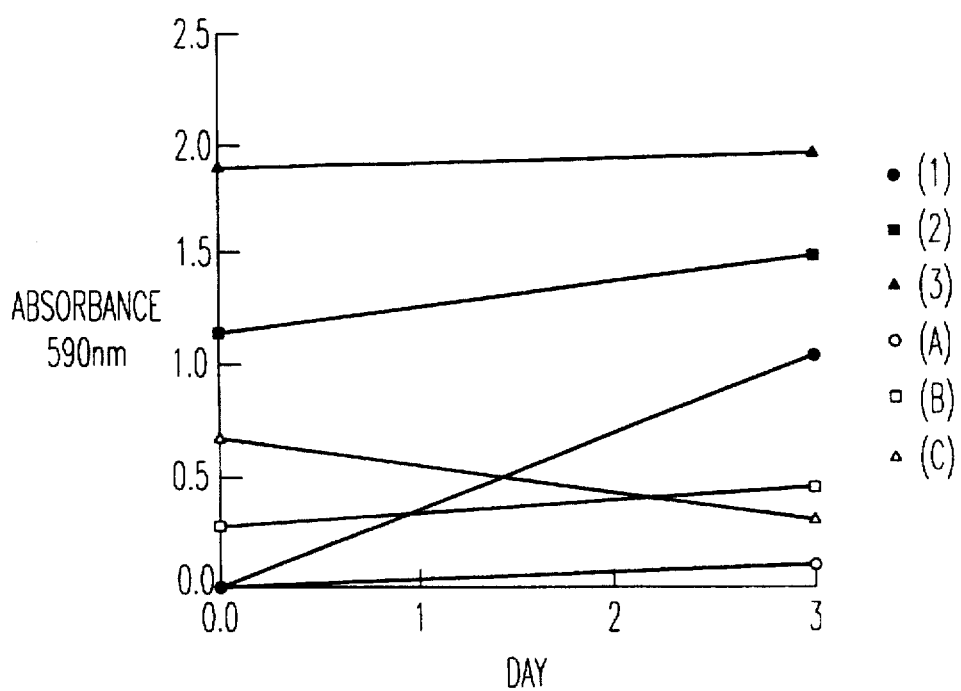
FIG. 4 depicts the relationship between the amount of blue coloring and the pH of the reaction mixture. The reaction mixture 1 through 3 were at pH 5.6, whereas A through C at pH 3.5.

It is apparent in FIG. 4 that higher yield of blue color were obtained with the solutions prepared using buffer having a pH of 5.6, than with the solutions prepared using distilled water having a pH of 3.5.

EXAMPLE 5

25 mg PeCSO powder and 50 mg alliin were dissolved in 7.5 mL of 0.1M sodium acetate buffer, 2.5 mL of purified alliinase (400 u/mL) solution was added to the solution, and the mixture was allowed to react for 1 minute at 37° C., the reaction product was extracted three times with ether, and was dried in an evaporator.

The resulting dry reaction product was then redissolved in 50 mL of the same buffer as above, 0.5 mL of 1M glycine solution was then added to the solution, and the mixture was warmed for 3 days at 37° C. to obtain a blue pigment solution.

An equivalent amount of glucose solution, sorbitol solution, sodium ascorbate solution, and a mixed solution of glucose and sodium ascorbate were added to and mixed with the aforementioned blue pigment solution, and the absorbance at 590 nm of each solution was then measured. Each solution was subsequently dried in an evaporator, then reconstituted with water to make the pigment concentration equal to that prior to the aforementioned drying operation. The absorbance of the reconstituted pigment solution was measured at 590 nm. The results are given in Table 1. In the table, the color stability (%) was calculated by dividing the absorbance of reconstituted solution at 590 nm following drying by the absorbance of the pigment solution at 590 nm prior to drying, and multiplying by 100(%)

An equivalent amount of distilled water was added to and mixed with the aforementioned blue pigment solution for use as a control.

TABLE 1

| Sample | Concentration (%) | Stability (%) |
|---|---|---|
| Control | — | 69.9 |
| Glucose | 0.625 | 78.7 |
| Glucose | 1.25 | 83.7 |
| Glucose | 2.5 | 80.2 |
| Glucose | 5.0 | 83.4 |
| Sorbitol | 0.625 | 71.1 |
| Sorbitol | 1.25 | 74.4 |
| Sorbitol | 2.5 | 82.3 |
| Sorbitol | 5.0 | 77.6 |
| Sodium ascorbate | 2.5 | 82.6 |
| Glucose + Sodium ascorbate | 5.0 + 2.5 | 85.3 |

It is apparent in Table 1 that concentrated blue pigments containing glucose, sorbitol, and sodium ascorbate were more stable than the control, and that the effects were even better when the additives were combined.

EXAMPLE 6

15 mg PeCSO powder and 30 mg alliin were dissolved in 3 mL of 0.1M sodium acetate buffer, to which 0.75 mL purified alliinase (400 u/mL) solution was added and the mixture was allowed to react for 1 minute at 37° C., the reaction product was extracted three times with ether, and was dried in an evaporator, and the dried product was redissolved in 3 mL of the same buffer as above. 16 mL of the same buffer as above and 2 mL of 0.5M glycine solution were then added to 2 mL of the above solution, and the mixture was warmed for 3 days at 37° C. to obtain a blue pigment solution.

5 mL of the blue pigment solution obtained above was then passed through a 1 mL DIAION HP-20 column. After washing the column with distilled water, blue pigments adsorbed on the column was eluted with 5 mL ethanol, and the absorbance of the eluate at 590 nm was then measured. The eluate was then dried in an evaporator and subsequently redissolved in water to make the concentration equal to that prior to drying treatment, and the absorbance at 590 nm was measured.

The results are given in Table 2. In the table, the stability (%) was calculated by dividing the absorbance at 590 nm following drying by the absorbance at 590 nm prior to drying, and multiplying by 100(%).

TABLE 2

| Absorbance before drying | Absorbance after drying | Stability (%) |
|---|---|---|
| 0.4467 | 0.4485 | 100.4 |

It is apparent in Table 2 that treating the resulting blue pigments with porous resin to remove the impurities yielded better blue pigment stability, with virtually no difference between the absorbance values before and after drying.

As described above, the present invention relates to a method for manufacturing blue pigments, comprising the steps of combining and warming the reaction product of PeCSO and alliinase, an amino acid, and allicin in an aqueous solution, thereby enabling the efficient manufacture of a natural blue pigment that can be used in food products and the like, the development of which has been strongly desired in the past. A relatively clear-toned blue pigment can also be readily manufactured. The resulting blue pigment is suitable for use as a colorant in food, bath agent, cosmetics, toy, clothing, and the like.

What is claimed is:

1. A method for manufacturing a blue pigment, comprising the steps of:

combining and warming the reaction product of trans-(+)-S-(1-propenyl)-L-cysteine sulfoxide (PeCSO) and alliinase, an amino acid, and allicin in an aqueous solution.

2. A method for manufacturing a blue pigment as defined in claim 1, further comprising the steps of extracting the reaction product of PeCSO and alliinase with a water-insoluble organic solvent, then adding an amino acid to react it with the resulting component, and subsequently adding allicin to the reaction mixture for another reaction of them.

3. A method for manufacturing a blue pigment as defined in claim 1, further comprising the steps of combining the reaction product of PeCSO and alliinase, an amino acid, and allicin in an aqueous solution, and subsequently heat treating these materials before they are warmed.

4. A method for manufacturing a blue pigment concentrate, comprising the steps of adding one or more saccharides, sugar alcohols, or reducing agents to the blue pigment obtained by the method as defined in claims 1 through 3, and subsequently concentrating the resulting mixture.

* * * * *